United States Patent
Olver

(10) Patent No.: US 8,222,165 B2
(45) Date of Patent: Jul. 17, 2012

(54) COMPOSITE FIRE SHIELD

(75) Inventor: Bryan William Olver, Nobleton (CA)

(73) Assignee: Pratt & Whitney Canada Corp., Longueuil (CA)

( * ) Notice: Subject to any disclaimer, the term of this patent is extended or adjusted under 35 U.S.C. 154(b) by 759 days.

(21) Appl. No.: 12/258,679

(22) Filed: Oct. 27, 2008

(65) Prior Publication Data

US 2010/0105266 A1   Apr. 29, 2010

(51) Int. Cl.
   *B32B 5/02*   (2006.01)
   *B32B 27/04*  (2006.01)
   *B29C 65/00*  (2006.01)

(52) U.S. Cl. .............. 442/136; 428/297.4; 428/920; 428/921; 156/60

(58) Field of Classification Search .............. 442/136; 428/297.4, 920, 921
See application file for complete search history.

(56) References Cited

U.S. PATENT DOCUMENTS

| | | |
|---|---|---|
| 2,835,107 A | 5/1958 | Ward |
| 2,992,960 A | 7/1961 | Leeg et al. |
| 3,573,123 A | 3/1971 | Siegel et al. |
| 3,600,249 A | 8/1971 | Jackson et al. |
| 3,713,959 A | 1/1973 | Rottmayer et al. |
| 3,779,006 A | 12/1973 | Lewis et al. |
| 3,811,997 A | 5/1974 | Yuan |
| 3,914,494 A | 10/1975 | Park |
| 4,061,812 A | 12/1977 | Gilwee, Jr. et al. |
| 4,255,483 A | 3/1981 | Byrd et al. |
| 4,522,673 A | 6/1985 | Fell et al. |
| 4,767,656 A | 8/1988 | Chee et al. |
| 5,308,692 A | 5/1994 | Kennedy et al. |
| 5,389,716 A | 2/1995 | Graves |
| 5,484,653 A | 1/1996 | Kennedy et al. |
| 6,013,361 A | 1/2000 | Seal et al. |
| 6,663,051 B2 | 12/2003 | Okuyama |

*Primary Examiner* — Norca L Torres Velazquez
(74) *Attorney, Agent, or Firm* — Norton Rose Canada LLP

(57) ABSTRACT

A fire-critical aircraft or other component within a fire-risk zone includes a protective fire shield directly exposed to the fire-risk zone and separating the fire-critical component therefrom. The fire shield has an entirely composite construction composed of fiber cloth impregnated with a sacrificial resin which has a melting point that is below that of the fiber cloth. When exposed to fire, the fiber cloth remains substantially intact for at least the minimum period of time while the sacrificial resin is allowed to be at least partially consumed by the fire, such that the protective fire shield is partially sacrificed.

17 Claims, 4 Drawing Sheets

COMPOSITE FIRE SHIELD

TECHNICAL FIELD

The field relates generally to fire protection on board vehicles, such as aircraft.

BACKGROUND

In order to meet airworthiness certification requirements, portions of aircraft, such as the engines, are required to be able to function for a specific period of time when exposed to fire, for example in the event of an engine fire. The intent is to ensure a flight that may be safely completed in the unlikely event a fire should occur. In order to be able to withstand fire for the necessary period, additional fire protection is sometimes added to the portion/part in question, such as in the form of protective blankets and the like. On aircraft, however, reduced weight and envelope requirements are continuously sought, as well as better performance, etc. Improved fire protection is therefore desired.

SUMMARY

There is provided an aircraft fire shielding system comprising: a fire-critical aircraft component within a fire risk-zone of the aircraft, the fire-critical component being required to withstand fire for a minimum period of time, the component comprising a body, the system having a protective fire shield covering the body, the fire shield directly exposed to said fire-risk zone and separating said fire-critical component from said fire-risk zone, the protective fire shield having an entirely composite construction composed of fibre cloth impregnated with a sacrificial resin, the sacrificial resin having a melting point that is below that of the fibre cloth, the fibre cloth having a melting point that is above an expected temperature of a fire in the fire-risk zone, such that when directly exposed to fire within said fire-risk zone the fibre cloth of the protective fire shield remains substantially intact for at least said minimum period of time while the sacrificial resin is allowed to be at least partially consumed by the fire thereby absorbing heat energy and limiting heat transfer to the fire-critical component for at least said minimum period of time.

There is also provided a method of protecting a fire-critical aircraft component from fire for a minimum period of time, the method comprising: providing a fire-critical aircraft component for mounting within a fire-risk zone of the aircraft; providing a fire shield having an entirely composite construction including a fibrous matrix within a sacrificial resin, the step of providing including selecting the fibrous matrix to have a melting point above an expected temperature of a fire within the fire-risk zone and selecting the sacrificial resin to have a melting point below that of the fibrous matrix; and allowing the sacrificial resin of the fire shield to be at least partially consumed by the fire when the fire shield is exposed thereto, while the fibrous matrix remains substantially intact for at least said minimum period of time.

There is further provided a fire-critical aircraft component, the fire-critical component comprising a body configured for mounting within a fire-risk zone of an aircraft, the component having a protective fire shield covering the body, the fire shield being directly exposed to said fire-risk zone and separating said body of the component from said fire-risk zone, the protective fire shield configured to withstand a 2000° F. fire for at least a 15-minute period, the protective fire shield having an entirely composite construction composed of a fibrous matrix having multiple plies of carbon fibre cloth impregnated with a sacrificial epoxy resin, the sacrificial epoxy resin having a melting point that is below that of the carbon fibre cloth and the carbon fibre cloth having a melting point that is above 2000° F. such that when directly exposed to said 2000° F. fire within said fire-risk zone the carbon fibre cloth of the protective fire shield remains substantially intact for at least said 15-minute period while the sacrificial epoxy resin is configured to be at least partially consumed by the fire before expiry of said 15-minute period, the at least partial consumption of the sacrificial epoxy resin thereby absorbing heat energy and limiting heat transfer to the fire-critical component for at least said 15-minute period.

Further details of these and other aspects will be apparent from the detailed description and figures included below.

DESCRIPTION OF THE DRAWINGS

Reference is now made to the accompanying figures in which:

FIG. 1 shows an isometric view of a bypass duct of a gas turbine engine, showing fire protection according to the prior art;

FIG. 2 shows a schematic cross-section of a composite fire protection cover overlying a part of the gas turbine engine;

FIG. 3 is a perspective view of a composite fire protection cover shaped to enclose the mount portion of the gas turbine engine of FIG. 1; and FIG. 4 is a perspective view of another composite fire protection cover, in this example shaped to enclose a different feature of the gas turbine engine, such as a fuel metering unit.

DETAILED DESCRIPTION

FIG. 1 illustrates a portion of an aircraft engine 10, in this case a bypass duct 12 of a gas turbine engine. The engine 10 has an engine mount 14, for mounting the engine to the aircraft, which is protected by a prior art fire blanket 16. The blanket is made, for example, from an insulating and/or flame retardant material such as fibreglass, various fabrics coated in a flame retardant, ceramic fibres, fabric impregnated silicone rubber, aluminum coated fibreglass fabric, and the like. These blankets may be both relative soft and flexible or slight more rigid, such as by including outer stainless steel sheets between which these insulation materials are sandwiched. All of these prior art fire blankets, however, are configured to withstand a nearby fire largely intact (i.e. the blanket is not consumed by fire coming in direct contact with the blanket 16). Such prior art fire/thermal blankets 16 also often use insulating materials to prevent fire by reducing the temperatures of the exposed surfaces to prevent ignition of any flammable fluid coming into contact therewith.

Indeed, the engine may have mounted thereto a number of components which are identified fire-critical components, i.e. components which must be protected from fire, should an emergency fire ever occur within the engine and/or within the nacelle surrounding the engine. These may for example include, but are certainly not limited to, engine mounts, fuel metering unit covers, external hot section components, fuel/oil heat exchangers, electrical components, wiring, and the like. As such, certain fire-critical components that are disposed within or exposed to such fire-risk zones of the engine must be protected by a protective fire cover (i.e. a fire shield) such that, in the eventuality of a fire, these fire-critical components will not be disabled by the fire. More particularly, in order for the engine to meet the necessary airworthiness certification standards, these components must be able to withstand fire for a minimum period of time, for example a period of time sufficient long for the pilot of the aircraft to take the necessary precautionary actions, such as land the aircraft, shut down the engine, disable the fuel flow to the engine, etc. For example, in at least one certification test, such fire-critical components must be able to withstand a fire with a temperature of 2000 degrees F. for at least fifteen minutes.

Figure 1:
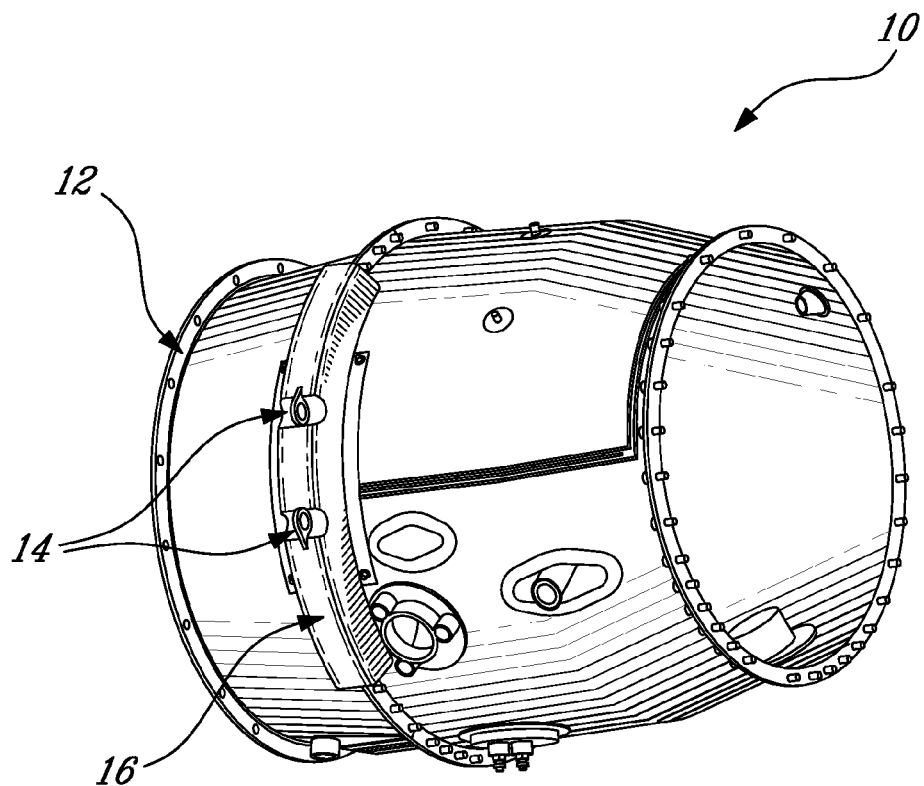
Figure 2:
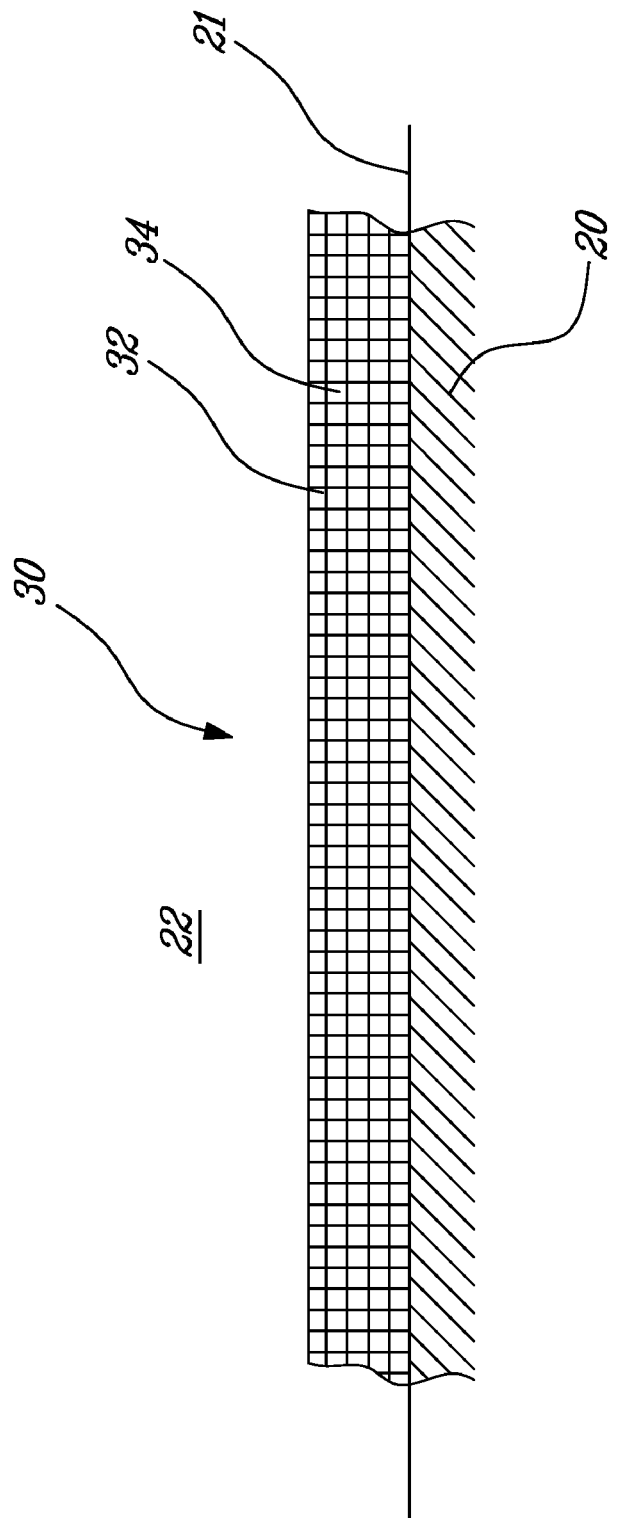

Referring to FIG. 2, the engine incorporates at least one protective fire shield 30 that is disposed between a fire-critical component 20 and a fire-risk zone 22 within and/or surrounding the engine 10 as shown in FIG. 1. Although the fire shield 30 is shown in FIG. 2 as being disposed directly on the outer surface 21 of the component 20, it is to be understood that the fire shield 30 may also be spaced apart therefrom, i.e. forming an air gap between the fire shield 30 and the outer surface 21 of the component 20, such in the embodiment shown in FIG. 3 wherein the fire shield 30 is a cover 50 that encloses the component 20 (not seen in FIG. 3).

The fire shield 30 is fully composite (i.e. non-metallic) and, in at least one possible embodiment, is structurally self-supporting. As shown schematically in FIG. 2, the composite fire shield 30 is generally composed of fibre cloth 32 impregnated with, and/or disposed within, a resin 34. Although several configurations of the fibre cloth 32 are possible, the fibre cloth 32 may in one embodiment form a multiple-ply fibrous matrix. For example, the fibrous matrix may constitute several overlapping of the composite fibre material. In one particularly embodiment, four superimposed plies of the fibre cloth are used, however it is to be understood that fewer or more plies of the fibre cloth can be provided. The fibre material selected for the fibre cloth 32 is a high-temperature resistant fibre, such as carbon fibre. More particularly, the carbon fibre may be graphite. The melting point of the fibre cloth may be higher than an expected temperature to which the fire shield 30 will be exposed during a fire. For example only, an expected temperature of the fire may be approximate 2000 degrees Fahrenheit (approximately 1093 degrees Celsius) and therefore the fibre cloth 32 employed in the fire shield 30 may be selected such that its melting point is above this expected fire temperature.

The fibre cloth 32 of the fire shield 30 is impregnated with and/or embedded within the resin 34, which is said to be a "sacrificial" resin because it is selected such as to have a melting point that is less than the melting point of the fibre cloth 32. More particularly, the sacrificial resin 34 therefore has a melting point that is less than the above-referenced expected fire temperature. As such, when the fire shield 30 is exposed to a fire, the resin 34 portion thereof will be at least partially, and possibly completely, consumed (i.e. burnt away) by the fire. This may occur rapidly (or even instantaneously) or alternately slower and over a period of time. Regardless, as the sacrificial resin 34 is consumed, energy is absorbed by the fire shield 30 during this change of state of the resin, thereby limiting the amount of heat transfer to the component 20 that is protected by the fire shield 30, at least for a predetermined minimum period of time. Further, after the sacrificial resin 34 has been consumed, the fibre cloth 32 which remains nonetheless protects the component 20 from the fire by limiting the amount of radiated heat that is transferred to the component. In fact, the fire shield 30 allows very little radiation on the component, and significantly reduces the amount of overall heat transfer thereto in the event of a fire. For example, in one embodiment, the fire shield 30 prevents all but $1/25^{th}$ of the heat transfer that the component would otherwise be subjected to when exposed to a fire, when compared to a simple steel fire shield.

Therefore, the fibre cloth 32 of the protective fire shield 30 remains substantially intact for at least the minimum period of time while the sacrificial resin is allowed to be at least partially consumed, thereby sacrificing a portion of the fire shield in the event of a fire. In one possible embodiment, the sacrificial resin is completely consumed during this minimum period of time. The minimum period of time in question may be, for example, stipulated by airworthiness and/or other certification standards that the engine must meet.

In fire tests conducted on test panels made of a construction similar to that of the fire shield 30 described above, and more particularly having a construction of four carbon fibre plies within an epoxy resin, the fire shield withstood a flame attack for a period of time of 15 minutes at a exposed temperature of 2000 degrees Fahrenheit (approximately 1093 degrees Celsius)+/−150 degrees Fahrenheit (approximately 65 degrees Celsius). This period of time and temperature also corresponds substantially to the required certification standards for engines. During the course of this period of time (i.e. 15 minutes), the epoxy resin was completely consumed by the flames, but the carbon fibre plies which remained nonetheless sufficiently protected the component during this period of time.

Clearly, if the fire shield 30 is exposed to fire for much longer periods, even with the carbon fibre cloth remaining present and thus reducing at the very least the radiation heat transfer, the component may eventually succumb to fire damage. However, the present fire shield 30 is intended to provide an easy to manufacture, low cost and light weight fire protection alternative to the complex, heavy and expensive fire protection devices (such as metal-reinforced insulating blankets) typically employed, such as to, in effect "buy time" (i.e. the minimum period of time during which the fire shield 30 is able to most effectively protect the component) during which time the component covered by the fire shield will remain safely protected.

It is also of note that heat transfer along a composite ply is about one third that of steel, that the heat transfer across multiple plies is about one twenty-fifth of steel. As such, by providing a multiple-ply protective fire shield, an efficient fire barrier is provided.

The present composite fire shield 30, therefore, provides a composite fire barrier which is specifically constructed such as to allow the resin to burn away before the fibrous materials when exposed to fire, whereby by sacrificing a portion of the fire shield the heat transfer to the component is limited for at least a minimum period of time. The fire shield 30 offers a more affordable, lighter alternative to existing fire protection devices. Unlike most known barriers which are intended to be fire and/or temperature resistant, the present fire shield allows for a portion thereof to be consumed by the fire while nonetheless providing sufficient fire protection for long enough to meet the necessary safety standards required to certify an engine for example.

As noted above, the present fire shield 30 may take many forms, for example is may be provided in a blanket form, such that it can be wrapped about an engine component to be protected, or it may be provided as a structurally-self supported part in it own right.

Figure 3:
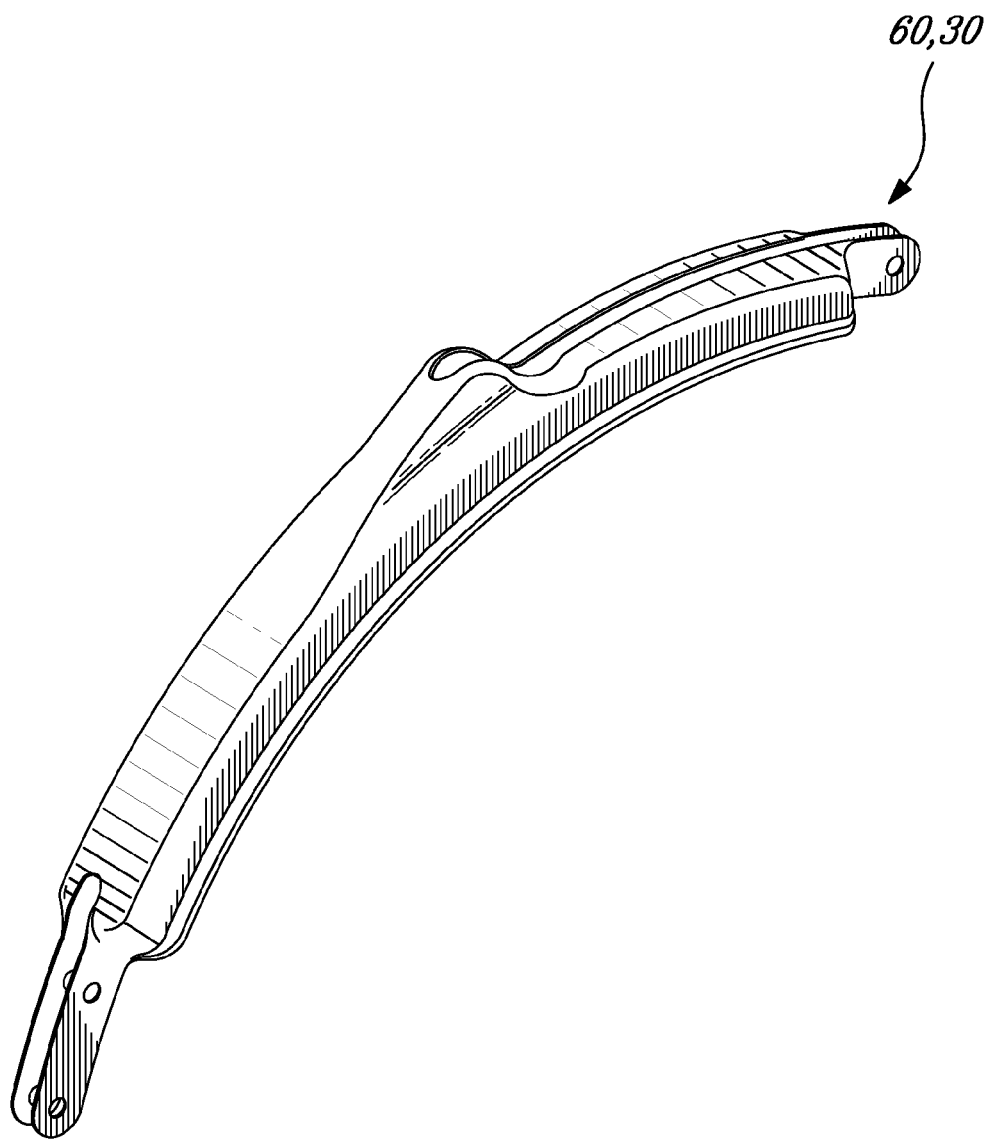

Referring to FIG. 3, the fire shield 30 may be a protective engine mount cover 60 that is formed of the composite fire shield construction described above. The fire shield cover 60 is configured to protect, for example, the aft engine mount of the engine from fire, while fitting within a smaller space envelope that existing fire blankets providing the same level of fire protection.

Figure 4:
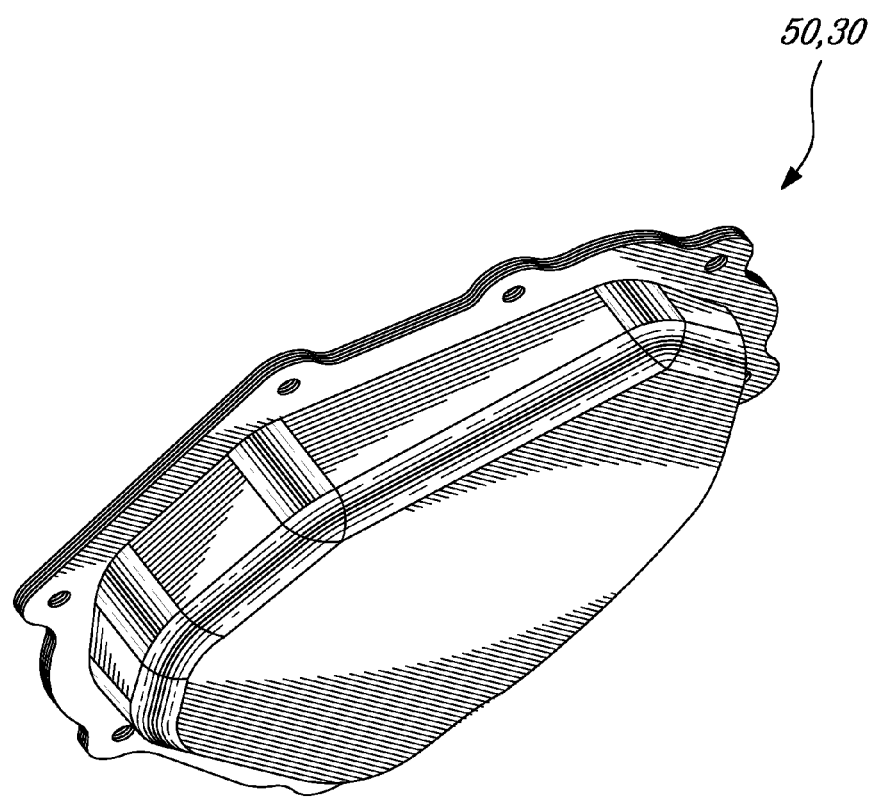

In another example, as shown in FIG. 4, a cover 50 may be fully composed of the above-described composite structure such that the casing/cover itself acts as a fire shield to whatever may be enclosed by the cover in question. For example, the cover 50 may be a cover for FMU (fuel metering unit) stepper motor that is to be protected from fire attack. In this case, the entire existing cover of the FMU stepper motor is removed and replaced by the composite fire shield cover 50,30, thereby retro-fitting an existing engine. Of course, a new engine can also be designed with protective fire shields used in various locations in place of the metallic covers, casings, etc. previously used.

The above description is meant to be exemplary only, and one skilled in the art will recognize that changes may be made to the embodiments described without departing from the scope of the invention disclosed. For example, although application is described with reference to an aircraft engine, the approach may applied to any suitable aircraft component, and indeed components on other vehicles or situations which must meet similar fire-resistance standards. Various configurations of higher melting point fibre cloth and lower melting point resin construction are possible, while nonetheless providing a composite fire shield which permits a portion thereof to be intentionally sacrificed, in the even of a fire, while nevertheless sufficiently protecting the component for at least a minimum period of time. Further, the fire shield may take many forms, such as a blanket, a cover that partially or wholly encloses the component to be protected, and the like. Still other modifications which fall within the scope of the present invention will be apparent to those skilled in the art, in light of a review of this disclosure, and such modifications are intended to fall within the appended claims.

The invention claimed is:

1. An aircraft fire shielding system comprising: a fire-critical aircraft component within a fire risk-zone of the aircraft, the fire-critical component being required to withstand fire for a minimum period of time, the component comprising a body, the system having a protective fire shield covering the body, the fire shield directly exposed to said fire-risk zone and separating said fire-critical component from said fire-risk zone, the protective fire shield having an entirely composite construction composed of fibre cloth impregnated with a sacrificial resin, the sacrificial resin having a melting point that is below that of the fibre cloth, the fibre cloth having a melting point that is above an expected temperature of a fire in the fire-risk zone, such that when directly exposed to fire having a temperature of at least 2000° F. within said fire-risk zone the fibre cloth of the protective fire shield remains substantially intact for at least 15 minutes while the sacrificial resin is allowed to be at least partially consumed by the fire thereby absorbing heat energy and limiting heat transfer to the fire-critical component for at least said minimum period of time.

2. The system as defined in claim 1, wherein the sacrificial resin is completely consumed prior to said minimum period of time elapsing.

3. The system as defined in claim 1, wherein the fibre cloth comprises a multiple-ply fibrous matrix.

4. The system as defined in claim 3, wherein the fibrous matrix includes four plies of said fibre cloth.

5. The system as defined in claim 1, wherein the fibre cloth includes carbon fibre and the sacrificial resin includes an epoxy resin.

6. The system as defined in claim 1, wherein the protective fire shield is disposed over of the fire-critical component.

7. The system as defined in claim 6, wherein the protective fire shield is disposed in direct contact with the fire-critical component.

8. The system as defined in claim 1, wherein the fire shield is a structurally self-supporting pre-moulded cover which encloses the fire-critical component.

9. A method of protecting a fire-critical aircraft component from fire for a minimum period of time, the method comprising:

providing a fire-critical aircraft component for mounting within a fire-risk zone of the aircraft;

providing a fire shield having an entirely composite construction including a fibrous matrix within a sacrificial resin, the step of providing including selecting the fibrous matrix to have a melting point above an expected temperature of a fire within the fire-risk zone such that it remains substantially intact for at least 15 minutes when exposed to fire having a temperature of at least 2000° F. and selecting the sacrificial resin to have a melting point below that of the fibrous matrix; and allowing the sacrificial resin of the fire shield to be at least partially consumed by the fire when the fire shield is exposed thereto, while the fibrous matrix remains substantially intact for at least said minimum period of time.

10. The method as defined in claim 9, further comprising the step of installing the fire shield between the fire-critical part and the fire-risk zone of the aircraft.

11. The method as defined in claim 10, wherein said minimum period of time is defined by airworthiness certification standards.

12. The method as defined in claim 9, wherein the step of allowing further comprises allowing the sacrificial resin to be completely consumed by the time said minimum period of time elapses.

13. The method as defined in claim 9, wherein the fire shield is a structurally self-supporting, pre-moulded cover which encloses the fire-critical component, the method further comprising the step of replacing an original metallic cover enclosing said fire-critical component by the pre-moulded cover such as to retro-fit the gas turbine engine with said composite fire shield.

14. A fire-critical aircraft component, the fire-critical component comprising a body configured for mounting within a fire-risk zone of an aircraft, the component having a protective fire shield covering the body, the fire shield being directly exposed to said fire-risk zone and separating said body of the component from said fire-risk zone, the protective fire shield configured to withstand a 2000° F. fire for at least a 15-minute period, the protective fire shield having an entirely composite construction composed of a fibrous matrix having multiple plies of carbon fibre cloth impregnated with a sacrificial epoxy resin, the sacrificial epoxy resin having a melting point that is below that of the carbon fibre cloth and the carbon fibre cloth having a melting point that is above 2000° F. such that when directly exposed to said 2000° F. fire within said fire-risk zone the carbon fibre cloth of the protective fire shield remains substantially intact for at least said 15-minute period while the sacrificial epoxy resin is configured to be at least partially consumed by the fire before expiry of said 15-minute period, the at least partial consumption of the sacrificial epoxy resin thereby absorbing heat energy and limiting heat transfer to the fire-critical component for at least said 15-minute period.

15. The component as defined in claim 14, wherein the protective fire shield the fibrous matrix of the protective fire shield includes at least four plies of the carbon fibre cloth.

16. The component as defined in claim 14, wherein the sacrificial epoxy resin is completely consumed prior to said certification standard time period elapsing.

17. The component as defined in claim 14, wherein the fire shield is a structurally self-supporting pre-moulded cover which encloses the fire-critical component.

* * * * *